US007213965B2

(12) United States Patent
Daniels, Jr.

(10) Patent No.: US 7,213,965 B2
(45) Date of Patent: *May 8, 2007

(54) BEVERAGE MIXER

(75) Inventor: Thomas E. Daniels, Jr., Sandy, UT (US)

(73) Assignee: Back to Basics Products, LLC, Vernon Hills, IL (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/069,737

(22) Filed: Feb. 28, 2005

(65) Prior Publication Data

US 2005/0199534 A1 Sep. 15, 2005

Related U.S. Application Data

(63) Continuation of application No. 10/278,713, filed on Oct. 23, 2002, now Pat. No. 6,966,689, which is a continuation-in-part of application No. 10/012,239, filed on Nov. 13, 2001, now Pat. No. 6,527,433.

(60) Provisional application No. 60/248,254, filed on Nov. 13, 2000.

(51) Int. Cl.
    *A47J 43/46* (2006.01)

(52) U.S. Cl. ............... 366/192; 366/195; 366/205; 366/314

(58) Field of Classification Search ............ 366/189, 366/192, 194, 205, 302, 306, 314, 347, 349, 366/195–196; 99/348
See application file for complete search history.

(56) References Cited

U.S. PATENT DOCUMENTS

| 1,412,536 A | 4/1922 | Mayer |
| 1,874,079 A | 8/1932 | Black |

(Continued)

FOREIGN PATENT DOCUMENTS

| DE | 1 098 171 | | 1/1961 |
| DE | 29816201 U1 | * | 2/2000 |
| EP | 1475024 A1 | | 11/2004 |
| GB | 764 361 | | 12/1956 |
| JP | 7-227165 | * | 8/1995 |
| JP | 7-227166 | * | 8/1995 |
| JP | 7-231856 | * | 9/1995 |
| JP | 2004-41286 | * | 2/2004 |
| JP | 2004-65325 | * | 3/2004 |
| JP | 2004 113278 | | 4/2004 |
| JP | 2004-113278 | * | 4/2004 |
| JP | 2004 357752 | | 12/2004 |
| JP | 2005-328946 | * | 12/2005 |
| JP | 2006-102083 | * | 4/2006 |
| WO | WO2004/080252 A1 | | 9/2004 |
| WO | 2005/037036 A1 | * | 4/2005 |

OTHER PUBLICATIONS

Krups/Model #267-70. Upon information and belief of applicants or applicants' attorneys, this information represents a product that was known or used by others in this country before the invention thereof by the applicants for patents, or was in public use or on sale in this country more than one year prior to the date of the application for patent in the United States.

(Continued)

*Primary Examiner*—Charles E. Cooley
(74) *Attorney, Agent, or Firm*—Workman Nydegger

(57) ABSTRACT

A beverage mixer includes a container with a mixing assembly removably disposable on a base with a motor turning a drive mechanism engagable with the mixing assembly. A spout is operatively coupled to the container, and can include a valve operable to allow and restrict contents of the container and actuatable by an actuator. A cup indentation is positioned under the outlet opening of the spout when the container is disposed on the base. The cup indentation extends horizontally into the base and is formed by a perimeter of the base.

26 Claims, 7 Drawing Sheets

U.S. PATENT DOCUMENTS

| | | | |
|---|---|---|---|
| 2,066,997 | A | 1/1937 | Mueller |
| 2,070,545 | A | 2/1937 | Gilbert |
| D118,470 | S | 1/1940 | Drachenberg |
| 2,311,379 | A | 2/1943 | Gillanders |
| 2,315,018 | A | 3/1943 | Lawrence |
| D153,645 | S | 5/1949 | Stiles |
| D161,188 | S | 12/1950 | Klug |
| 2,559,196 | A | 7/1951 | Medred |
| 2,710,707 | A | 6/1955 | Persak et al. |
| 2,785,547 | A | 3/1957 | Barros |
| D183,177 | S | 7/1958 | Oertli |
| 2,945,634 | A | 7/1960 | Beck et al. |
| 3,042,265 | A | 7/1962 | Rodth |
| 3,088,345 | A | 5/1963 | Campbell |
| 3,107,711 | A | 10/1963 | Azmus |
| 3,346,029 | A | 10/1967 | Harris |
| 3,417,972 | A | 12/1968 | Vincent |
| 3,427,636 | A | 2/1969 | Seifert |
| 3,765,275 | A | 10/1973 | Johnson |
| 3,780,393 | A | 12/1973 | Gaetke |
| 3,895,548 | A | 7/1975 | Sauve |
| 3,920,224 | A | 11/1975 | Fassauer |
| 3,938,784 | A | 2/1976 | Moreton |
| 4,030,707 | A | 6/1977 | Moreton |
| 4,116,366 | A | 9/1978 | Takenakashima et al. |
| 4,137,578 | A | 2/1979 | Felici |
| 4,201,487 | A | 5/1980 | Backhaus |
| 4,250,771 | A | 2/1981 | Berler |
| 4,268,080 | A | 5/1981 | Lindley |
| D269,471 | S | 6/1983 | Auerbach |
| 4,395,792 | A | 8/1983 | Cosner |
| 4,397,427 | A | 8/1983 | Howard |
| 4,488,664 | A | 12/1984 | Cleland |
| 4,513,688 | A | 4/1985 | Fassauer |
| 4,537,332 | A | 8/1985 | Brown et al. |
| 4,561,782 | A | 12/1985 | Jacobsen et al. |
| 5,302,021 | A | 4/1994 | Jennett et al. |
| 5,323,691 | A | 6/1994 | Reese et al. |
| D363,634 | S | 10/1995 | Cohn |
| 5,479,851 | A | 1/1996 | McClean et al. |
| D370,151 | S | 5/1996 | McLinden et al. |
| 5,662,032 | A | 9/1997 | Baratta |
| 5,671,664 | A | 9/1997 | Jacobson |
| 5,690,021 | A | 11/1997 | Grey |
| 6,527,433 | B2 | 3/2003 | Daniels |
| D473,421 | S | 4/2003 | Daniels et al. |
| D474,065 | S | 5/2003 | Daniels |
| D474,067 | S | 5/2003 | Daniels, Jr. |
| D474,643 | S | 5/2003 | Daniels |
| 6,609,821 | B2 | 8/2003 | Wulf et al. |
| D483,607 | S * | 12/2003 | Chang Chien ............... D7/384 |
| 6,817,750 | B1 | 11/2004 | Sands |
| 6,837,153 | B1 * | 1/2005 | Chang Chien ............... 99/348 |
| 6,935,767 | B2 * | 8/2005 | Nikkhah ..................... 366/129 |
| 6,966,689 | B2 * | 11/2005 | Daniels, Jr. |
| 6,981,795 | B2 * | 1/2006 | Nikkah ........................ 366/314 |
| 2001/0006486 | A1 | 7/2001 | Ofverberg |
| 2003/0099154 | A1 | 5/2003 | Daniels, Jr. |
| 2004/0264294 | A1 * | 12/2004 | Pryor, Jr. .................... 366/129 |
| 2005/0018532 | A1 * | 1/2005 | Nikkah ........................ 366/129 |
| 2005/0018534 | A1 * | 1/2005 | Nikkah ........................ 366/205 |
| 2005/0045671 | A1 * | 3/2005 | Beesley et al. |
| 2005/0185507 | A1 * | 8/2005 | Beesley et al. |
| 2005/0207270 | A1 * | 9/2005 | Beesley ....................... 366/205 |
| 2006/0176765 | A1 * | 8/2006 | Pryor et al. ................. 366/196 |

OTHER PUBLICATIONS

Krups Instructions for Use Product Manual for Model #267. Upon information and belief of applicant or applicants' attorneys, this product manual represents a printed publication in this or a foreign country, before the invention thereof by the applicant for patent, or more than one year prior to the date of the application for patent in the United States.

Hamilton Beach/Model #3920J. Upon information and belief of applicants or applicants' attorneys, this information represents a product that was known or used by others in this country before the invention thereof by the applicants for patent, or was in public use or on sale in this country more than one year prior to the date of the application for patent in the United States.

Hamilton Beach Use & Care Product Manual for 1 & 2 speed Juice extractors. Upon information and belief of applicants' attorneys, this product manual represents a printed publication in this or a foreign country, before the invention thereof by the applicant for patent, or more than one year prior to the date of the application for patent in the United States.

Proctor Silex/Model #J101W. Upon information and belief of applicants or applicants' attorneys, this information represents a product that was known or used by others in this country before the invention thereof by the applicants for patent, or was in public use or on sale in this country more than one year prior to the date of the application for patent in the United States.

Sunbeam Oster/Model #323-08. Upon information and belief of applicants or applicants' attorneys; this information represents a products that was known or used by others in this country before the invention thereof by the applicants for patent, or was in public use or on sale in this country more than one year prior to the date of the application for patent in the United States.

Santos/Model #N 176944. Upon information and belief of applicants or applicants' attorneys, this information represents a product that was known or used by others in this country before the invention thereof by the applicants for patent, or was in public use or on sale in this country more than one year prior to the date of the application for patent in the United States.

Hamilton Beach/Model #395WS. Upon information and belief of applicants or applicant' attorneys, this information represents a product that was known or used by others in this country before the invention thereof by the applicants for patent, or was in public use or on sale in this country more than one year prior to the date of the application for application for patent in the United States.

Hamilton Beach/Model #67150. Upon information and belief of applicants or applicants' attorneys, this information represents a product that was known or used by others in this country before the invention thereof by the applicants for patent, or was in public use or on sale in this country more than one year prior to the date of the application for patent in the United States.

Hamilton Beach Use & Care Manual for Juice Extractor. Upon information and belief of applicant or applicants' attorneys, this product manual represents a printed publication in this or a foreign country, before the invention thereof by the applicant for patent, or more than one year prior to the date of the application for patent in the United States.

Hamilton Beach/Model #9600. Upon information and belief of applicants or applicants' attorneys, this information represents a product that was known or used by others in this country before the invention thereof by the applicants for patent, or was in public use or on sale in this country more than one year prior to the date of the application for patent in the United States.

Hamilton Beach Operation Manual for Juicer #96700 and 1G96700. Upon information and belief of applicant or applicants' attorneys, this product manual represents a printed publication in this or a foreign country, before the invention thereof by the applicant for patent, or more than one year prior to the date of the application for patent in the United States.

Hamilton Beach/Proctor Silex, Inc./Model #67150. Upon information and belief of applicants or applicants' attorneys, this information represents a product that was known or used by others in this country before the invention thereof by the applicants for patent, or was in public use or on sale in this country more than one year prior to the date of the application for patent in the United States.

Eight (8) color images of a Hamilton Beach product. Upon information and belief of applicants or applicant' attorneys, this information represents a product that was known or used by others in this country before the invention thereof by the applicants for patent, or was in public use or on sale in this country more than one year prior to the date of the application for patent in the United States.

* cited by examiner

BEVERAGE MIXER

This application is a continuation of U.S. patent application Ser. No. 10/278,713, filed Oct. 23, 2002, now U.S. Pat. No. 6,966,689, which is a continuation-in-part of U.S. patent application Ser. No. 10/012,239, filed Nov. 13, 2001, now U.S. Pat. No. 6,527,433, which claims benefit of U.S. Provisional Application No. 60/248,254, filed Nov. 13, 2000.

BACKGROUND OF THE INVENTION

1. Field of the Invention

The present invention relates generally to beverage mixer, smoothie maker, or blender.

2. Related Art

Frozen, frosty, or icy drinks have become increasingly popular. Such drinks include the traditional shakes, and the more recently popular smoothies. Shakes, or milk shakes, are typically formed of ice-cream and/or milk, and flavored as desired, with or without additives, such as candies, chocolates, peanut butter, etc. Milkshakes typically are available at most fast-food restaurants, such as burger chains, and can be made by special machines, or hand-made using mixers.

Smoothies tend to be more healthy, and are formed of ice, frozen yogurt, and/or sorbet, and also can include additives such as fruit, berries, fruit juice, vitamins, etc. Smoothies typically are available from specialty chains or juice bars, and can be made with commercial or restaurant-grade blenders.

Such drinks also can be made at home, using a standard kitchen blender. One disadvantage with making such drinks, or utilizing blenders, is the difficulty in operating the blender, or the inadequacy of the blender. Blenders often get clogged or otherwise stalled by the drink ingredients. It is often necessary to supplement the blending by stirring the ingredients with a spoon or spatula. The spoon or spatula can get caught in the blades of the blender. In addition, using the spoon or spatula often requires removing the lid, thus increasing the chances for the ingredients to be expelled through the top of the container.

In addition, once the blending is completed, it is often necessary to remove the container from the blender and pour the contents into a drinking cup or glass. It will be appreciated that the container has an open top that is substantially larger than a typical drinking cup or glass. Thus, it is common for the contents to pour out of the wider opening of the container, and outside the narrower cup or glass, creating a mess to clean-up, and wasting the contents. In addition, it will be appreciated that the shakes or the smoothies tend to be thick and/or viscous, and thus can be difficult to pour.

SUMMARY OF THE INVENTION

It has been recognized that it would be advantageous to develop a smoothie maker, beverage mixer, or the like, capable of facilitating the making of smoothies, frozen drinks, and the like. In addition, it has been recognized that it would be advantageous to develop such a mixer or the like that facilitates mixing and/or stirring of the contents. In addition, it has been recognized that it would be advantageous to develop such a mixer or the like that facilitates pouring or removing the contents.

The invention provides a smoothie maker, beverage mixer, or the like that facilitates dispensing of the contents. The smoothie maker includes a base with a motor turning a drive mechanism extending therefrom. A container can be removably disposable on the base, and can include a mixing assembly rotatably disposed therein and engagable by the drive mechanism of the base when the container is disposed on the base. A spout can be operatively coupled to the container to dispense contents thereof through an outlet opening. A valve can be associated with the spout and operable to allow and restrict contents of the container through the spout. An actuator can be associated with the spout and operatively coupled to the valve to actuate the valve.

In accordance with a more detailed aspect of the present invention, the smoothie maker can include a beverage cup accommodation indentation that includes an indentation configuration of the base itself. The indentation is positioned under the outlet opening of the spout, so that when the container is disposed on the base, a beverage cup can be more conveniently placed adjacent the spout in the indentation. In addition the indentation extends into the base to reduce a length of the spout to reduce frictional loses of contents flowing through the spout. The base can include a perimeter base wall extending around and defining a perimeter of the base. The indentation can be formed in a perimeter of the base by the perimeter base wall. The indentation can extend horizontally into the base, and can extend from a top of the indentation proximate the spout, when the container is disposed on the base, to a bottom of the indentation proximate a bottom of the base.

In accordance with another more detailed aspect of the present invention, the smoothie maker can include a pressurization system to increase pressure in the container, and expel the contents through the spout. An air pump can be associated with the base and can be driven by the motor. An air line can be operatively coupled to and between the air pump and the container, to deliver air from the pump to the container to assist dispensing contents of the container through the spout. The container can form a substantially air-tight enclosure, along with the lid, the bottom portion, and/or the stir stick. The air line can be coupled to the container, the lid, the bottom portion, or the stir stick.

In accordance with another more detailed aspect of the present invention, the smoothie maker can include an impeller to further drive the contents of the container through the spout. The impeller can be associated with the mixing assembly in the container. In addition, the impeller can form an oblique angle oriented to drive contents of the container towards an opening in the container and out of the spout. The impeller can include a horizontally oriented arm, with the arm having an oblique angle oriented to drive contents of the container downwardly to the bottom of the container. The impeller can include a vertically inclined arm, with the arm having an oblique angle oriented to drive contents of the container outwardly towards the opening.

In accordance with another more detailed aspect of the present invention, the container can have a circular, conical shape configured to facilitate a vortex action of contents in the container when the mixing assembly is operated. The circular, conical shape of the container having an angular orientation from a vertical axis approximately 10 to 25 degrees. The stir stick can be selectively pivotable to disturb the vortex action of the contents in the container when pivoted. The circular, conical shape of the container and the pivotable stir stick can cooperate to facilitate mixing of the contents.

Additional features and advantages of the invention will be apparent from the detailed description which follows,

DETAILED DESCRIPTION

Figure 1:
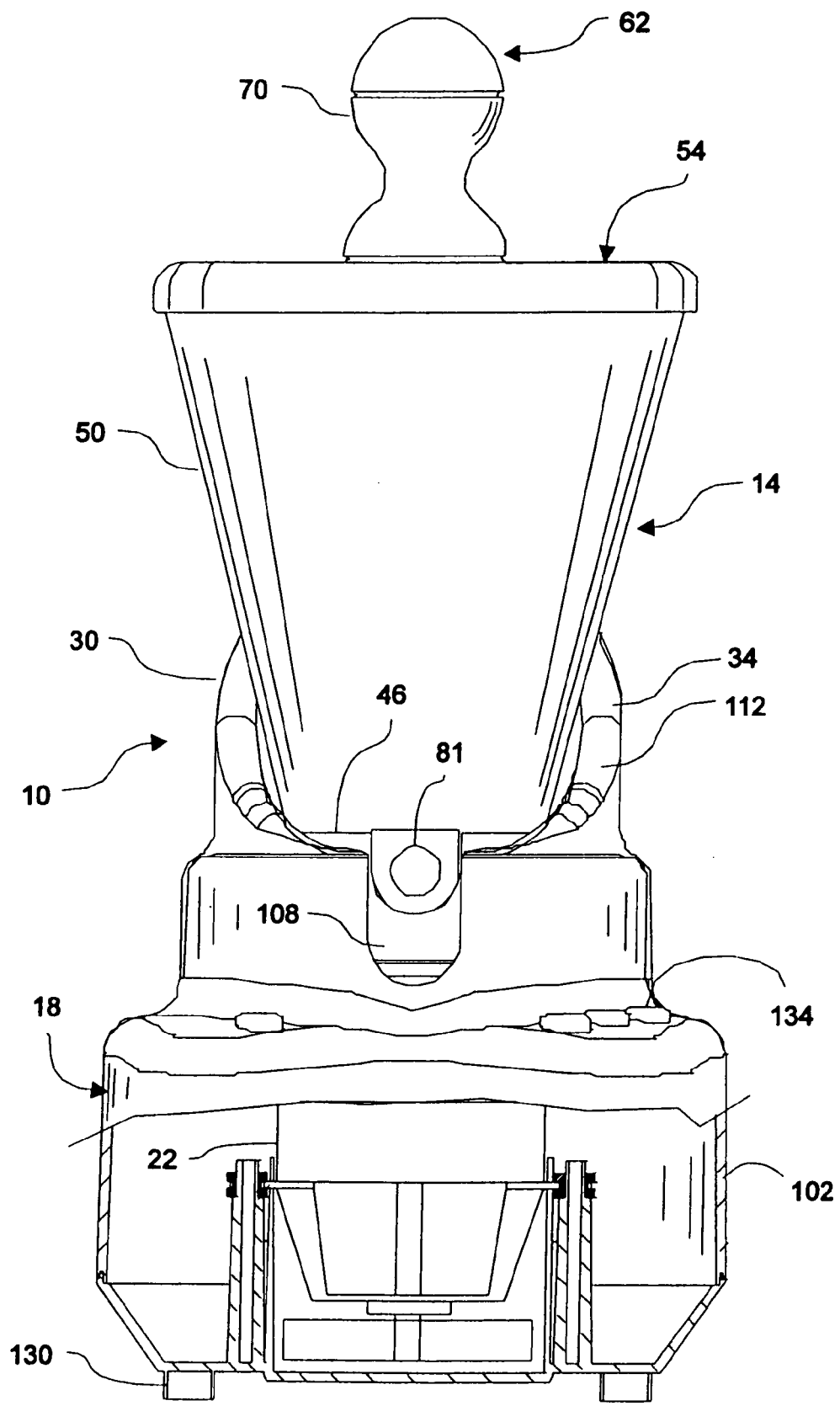
FIG. 1 is a partial broken away front view of a smoothie maker or beverage mixer in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
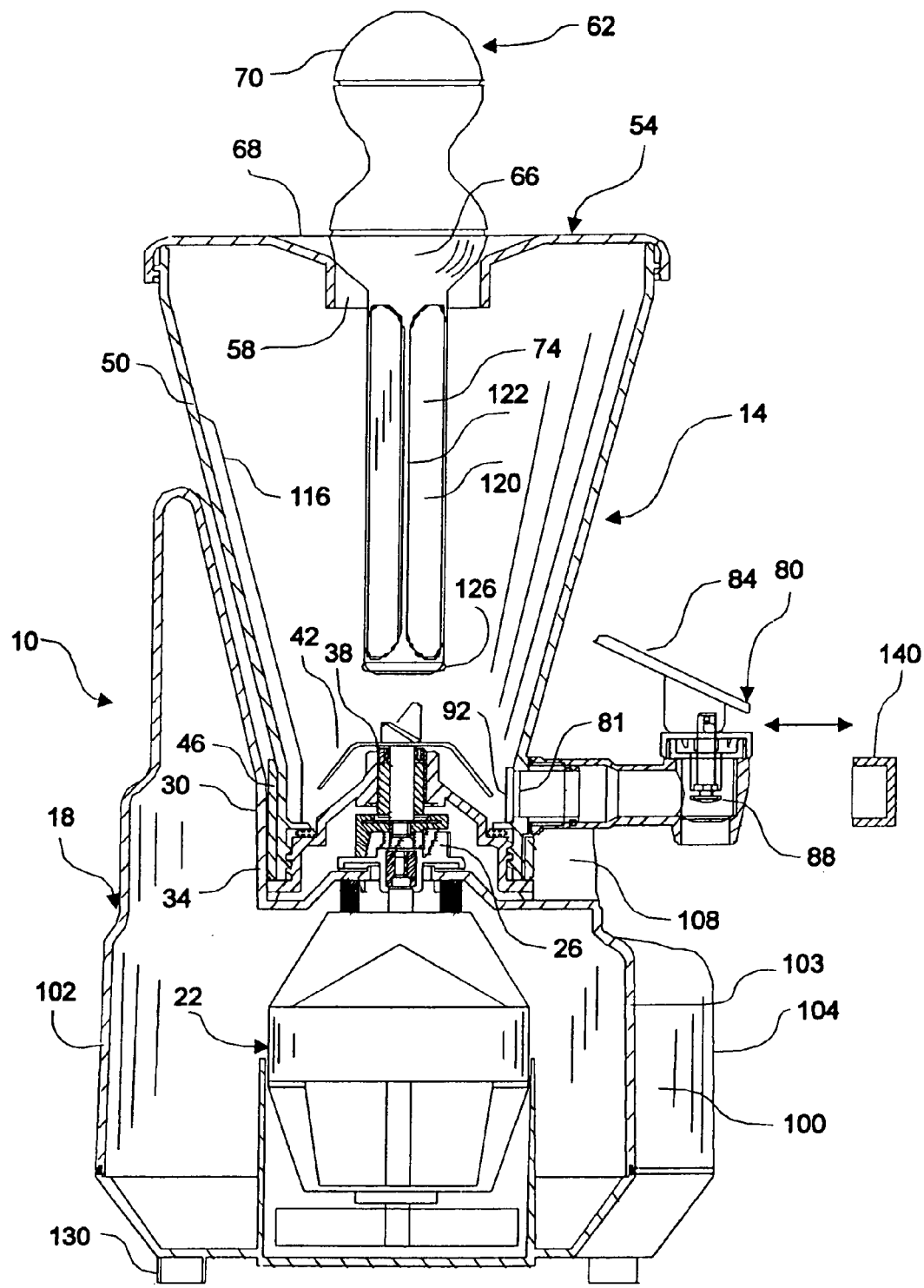
FIG. 2 is a cross sectional side view of the smoothie maker or beverage mixer of FIG. 1.
Figure 3:
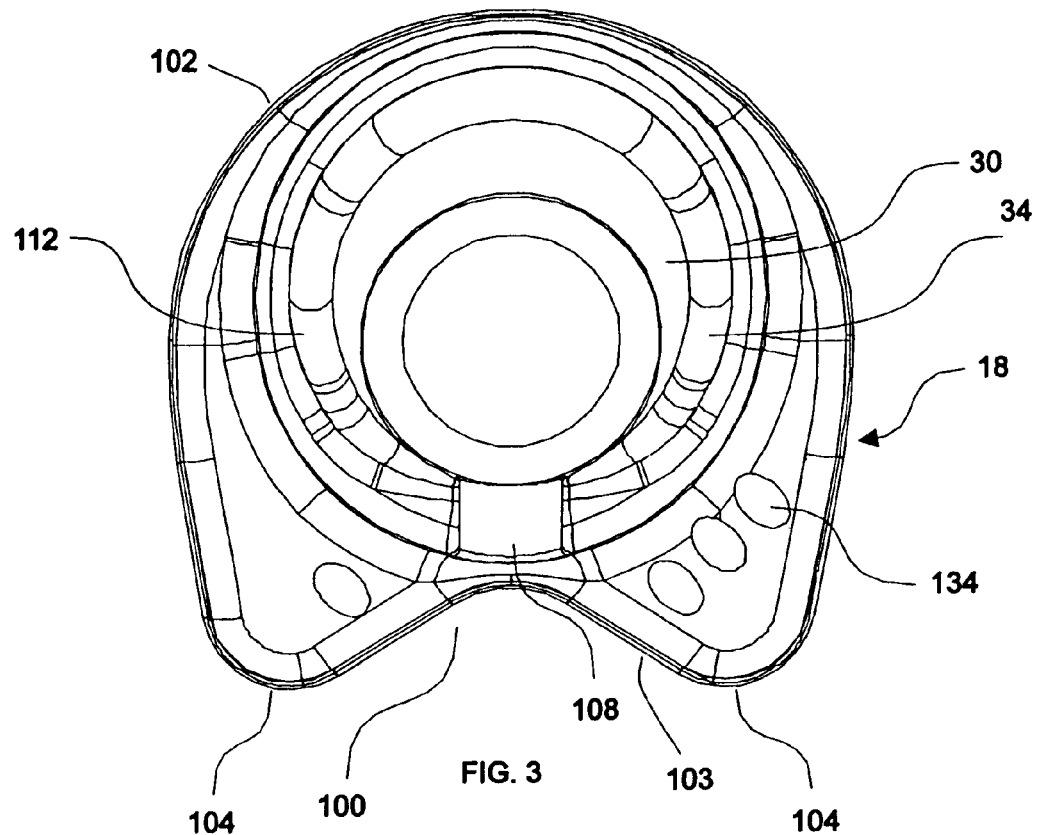
FIG. 3 is a top view of a base of the smoothie maker or beverage mixer of FIG. 1.
Figure 4:
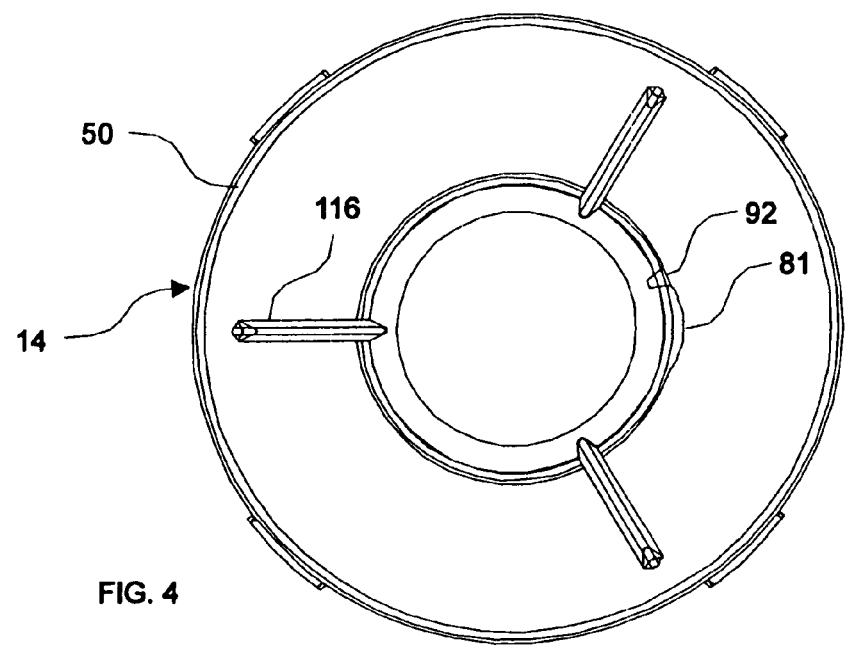
FIG. 4 is a top view of a container of the smoothie maker or beverage mixer of FIG. 1.
Figure 5:
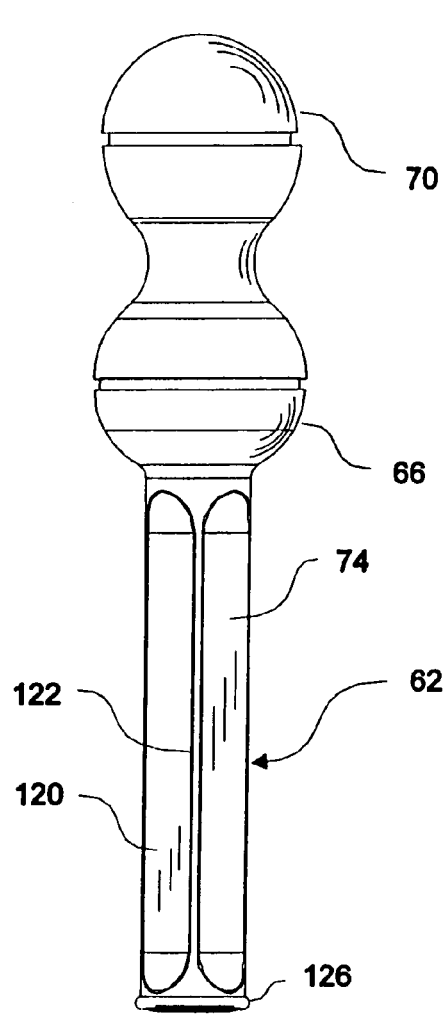
FIG. 5 is a side view of a stir stick of the smoothie maker or beverage mixer of FIG. 1.
Figure 6:
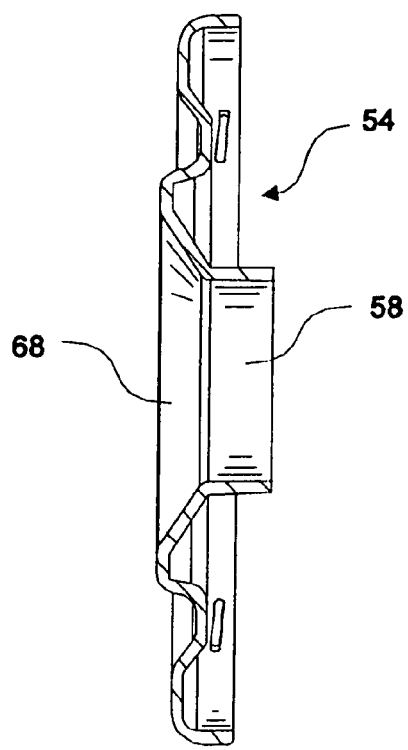
FIG. 6 is a cross sectional side view of a lid of the smoothie maker or beverage mixer of FIG. 1.
Figure 7:
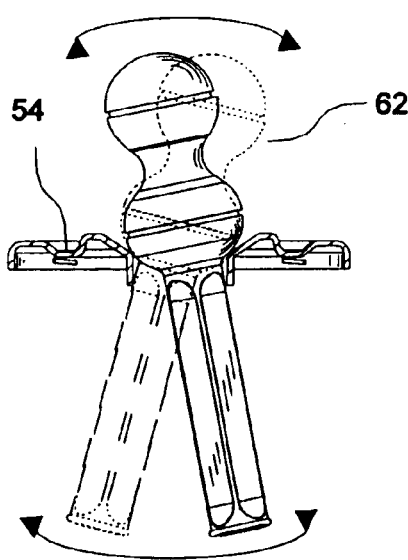
FIG. 7 is a schematic view of the stir stick pivoting with respect to the lid of the smoothie maker or beverage mixer of FIG. 1.

As illustrated in FIGS. 1–3, a smoothie maker, beverage mixer, or the like, indicated generally at 10, is shown in accordance with the present invention for making smoothies, frozen drinks, or the like. The smoothie maker or beverage mixer will be described below an illustrated with respect to a smoothie maker. It is of course understood that the present invention is equally applicable to beverage mixers and the like. Smoothies and frozen drinks are examples of a field that may benefit from use of such a smoothie maker 10. The smoothie maker 10 advantageously includes a spout and cup indentation to facilitate pouring of the smoothie, means for pressurizing a container to expel contents of the container through the spout, an impeller to expel contents of the container through the spout, a stir stick operatively carried by a lid to facilitate stirring, and alignment structures to help align a spout of the container, as discussed in greater detail below.

The smoothie maker 10 can include a container or jar 14 removably disposable on a base or housing 18. Thus, the container 14 can be removed from the base 18 for cleaning, etc., while the base can include electrical components and the like. The base 14 can include a motor 22 capable of turning a drive mechanism 26 that extends from the base 18. In one aspect, the drive mechanism 26 can be located at a top of the base 18, and the container 14 can be disposable on the top of the base 18, and on top of the drive mechanism 26. Thus, the container 14 can utilize gravity to help maintain the container 14 on the base 18.

A receptacle or socket 30 can be formed with the base 18 and configured to receive the container 22, or a portion thereof. The receptacle 30 can be formed on the top of the base 18 with the drive mechanism 26 disposed within the receptacle 30. The receptacle 30 can include a perimeter wall 34 to receive the container 22, or portion thereof, therein. In one aspect, the receptacle 30 can be circular, and the perimeter wall 34 can be an annular wall.

The container 14 can include a mixing assembly 38 that can include a plurality of blades 42 rotatably disposed in the container 14. The mixing assembly 38 can be engaged by the drive mechanism 26 of the base 18 when the container 14 is disposed on the base 18, or in the receptacle 30. For example, the drive mechanism 26 and the mixing assembly 38 can include mating or matching couplings, such as one or more intermeshing protrusions and indentations, so that the rotation and force of the motor 22 in the base can be transferred to the mixing assembly 38 or blades 42 in the container 14. A lower portion or bottom of the container 14 can be configured to mate or match the receptacle 30 to help maintain the container 14 on the base 18, and to properly align the mixing assembly 38 of the container 14 with the drive mechanism 26 of the base 18, or couplings thereof. Thus, the lower portion or bottom of the container 14 can be circular to match the circular shape of the receptacle 30.

The container 14 can include a base or bottom portion 46 secured to a container portion 50. The base or bottom portion 46 can be circular to match the circular shape of the receptacle 30 as described above. The base portion 46 of the container 14 can be removably secured to the container portion 50, such as by screw threads, so that the container 14 can be disassembled for cleaning. In addition, the mixing assembly 38 can be secured to the container 14 by the base portion 46, or between the base portion 46 and the container portion 50. Thus, the mixing assembly 38 also can be removably secured to the container. The mixing assembly 38 can cooperate with the base portion 46 to engage the drive mechanism 26 of the base 18.

The container portion 50 can be a hollow shell with an annular wall to receive ingredients therein. In one aspect, the container 14 or container portion 50 can be an inverted, circular, frusto-conical shell. The purpose of the circular shape is described in greater detail below. In addition, the container portion 50 or shell or wall can be transparent, or formed of a transparent material, to enable viewing the contents of the container 14. A top of the shell or container 14 can be open to receive ingredients therethrough, while the bottom of the shell can be open to receive the mixing assembly 38 so that the mixing assembly 38 or blades 42 can operatively engage the contents of the container 14. The base portion 46 can be configured as a cup to receive a bottom portion of the container portion 50 or shell therein, and to enclose the bottom of the container 14. Thus, the base portion 46 and container portion 50 can form the container 14.

A lid 54 can be removably disposed on the container 14 to resist expulsion of the contents or the ingredients in the container during mixing, or while the blades 42 are rotating.

The lid 54 can include an opening 58 therethrough. Thus, ingredients can be introduced into the container 14 either by removing the lid 54 and inserting the ingredients into the container 14, or by inserting the ingredients through the opening 58 in the lid.

A stir stick 62 advantageously is configured to be carried by the lid 54, and to cooperate with the lid 54, to allow the contents of the container 14 to be stirred with the stir stick 62, and/or to cover the opening 58 of the lid 54. The stir stick 62 can be extendable through the opening 58 in the lid 54 and into the container 14. In addition, the stir stick 62 can be pivotable with respect to the lid 54.

The stir stick 62 advantageously includes a bulbous or ball portion 66 pivotally disposable over the opening 58 of the lid 54. The lid 54 can include a conical or rounded indentation or socket 68 surrounding the opening 58 to receive the ball portion 66 of the stir stick 62. The ball portion 66 cooperates with the lid 54 to cover the opening 58 and to allow the ball portion 66 to pivot in the opening 58. Thus, the ball portion 66 of the stir stick 62 and the opening 58 in the lid 54 form a ball-and-socket type coupling. The ball portion 66 has a bulbous, spherical, semi-spherical, or rounded shape that slides smoothly in the opening 58 of the lid 54 as the stir stick 62 pivots in the container 14. In addition, the ball portion 66 limits the distance the stir stick 62 can be inserted into the container 14 to resist contact between the stir stick 62 and the mixing assembly 38 or blades 42. The lid 54 or opening 58 can be configured to match or mate with the ball portion 66.

The stir stick 62 also can include a handle portion 70 and a stir portion 74. The handle portion 70 is configured to extend above the lid 54, while the stir portion 74 is configured to extend below the lid 54, and into the container 14. The handle portion 70 can be configured to facilitate grasping. In one aspect, the handle portion 70 can have a bulbous, circular, or spherical shape that can be grasped by a user's hand.

The stir portion 74 can have a length that extends to a location above the mixing assembly 38 or blades 42, but without contacting the blades 42, to prevent damage. The length of the stir portion 74 and the ball portion 66 captured in the opening 58 of the lid 58 advantageously prevent the stir stick from reaching and interfering with the mixing assembly 38.

Figure 9:
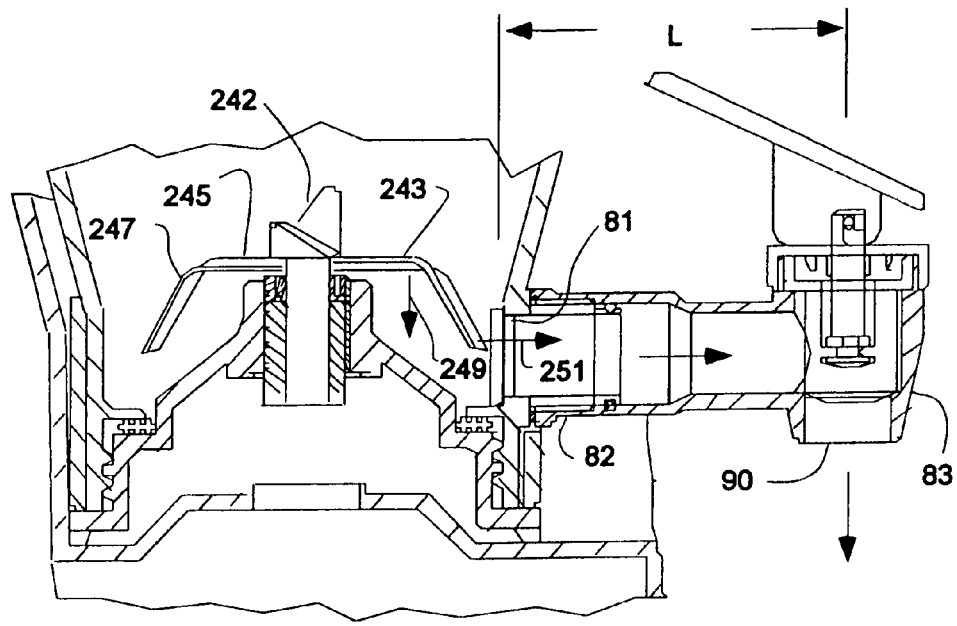
FIG. 9 is a partial cross sectional side view of the smoothie maker of FIG. 8.

A spigot or spout 80 advantageously is operatively coupled to the container 14 at or near the bottom of the container 14. The spout 80 advantageously allows the contents of the container 14 to be dispensed through the spout 80, as opposed to being poured through the top of the container. The container 14 or base portion 46 can have an opening 81, with a proximal end 82 of the spout coupled to the container or base portion at the opening. The spout 80 can form a fluid channel through with the contents of the container flow to be dispensed. The spout 80 can include any type of valve and/or actuation system. For example, the spout 80 can include a handle 84 for displacing a plunger type valve 88 within the spout 80. Thus, by lifting/depressing/turning the handle 84, the valve 88 is displaced allowing the contents of the container 14 to flow through the spout 80. The valve 88 and/or actuator or handle 84 can be positioned at a distal end 83 of the spout. The spout 80 can include an outlet opening 90 positioned at the distal end 83. As seen in FIG. 9, the outlet opening 90 extends horizontally and faces downward. The spout 80 extends outwardly and away from the container 14, to a position beyond a perimeter of the base so that the contents can be dispensed while the container remains on the base.

The container 14 and base 18 advantageously are configured to facilitate dispensing the contents of the container 14 through the spout 80. As described above, the contents of the container, such as a smoothie or milk shake, can be thick or viscous, and thus difficult to dispense by pouring out of the top of the container. While the spout can facilitate dispensing the contents, it will be appreciated that it can be difficult for the thick or viscous contents to flow through the spout. The longer the spout, the more friction is developed between the contents and the spout. Thus, the spout 80 can have a length L that is minimized. While the spout 80 should have a length that extends beyond the base in order to pour, it has been recognized that the base 18 itself can be configured to reduce the length of the spout, and thus reduce the frictional losses associated with the flow of the contents through the spout. The base 18 itself can include an indentation configuration with a beverage cup accommodation indentation 100. The indentation 100 is positioned under the outlet opening 90 of the spout 80 so that when the container 14 is disposed on the base 18, a beverage cup can be more conveniently placed in the indentation 100 and under the spout 80. The indentation 100 advantageously extends into the base 18 to reduce the length L of the spout 80, and thus reduces frictional loses of contents flowing through the spout.

The base 18 can include a perimeter base wall 102 extending around and defining a perimeter of the base 18. The indentation 100 can be formed in a perimeter of the base 18 by the perimeter base wall 102. The indentation 100 can extend horizontally into the base 80, and can be formed by a vertically oriented portion 103 of the perimeter base wall 102. The vertically oriented portion 103 of the perimeter base wall 102 extends from a top of the indentation 100 proximate the spout 80 when the container 14 is disposed on the base, to a bottom of the indentation 100 proximate a bottom of the base.

One or more protrusions 104 can extend horizontally outward from the base 18 adjacent the indentation 100. Thus, the indentation 100 can be disposed between, and defined by, protrusions 104 on either side. The protrusions 104 can be formed in the base 14 to properly position a cup or glass under the spout 80 to resist spills.

In addition, an alignment indentation 108 can be formed in the base 18 or the receptacle 30 to receive the spout 80 therein. The alignment indentation 108 can be located above the cup indentation 104 so that the spout 80 is positioned over the cup indentation 104 of the base 18 when the container 14 is disposed in the receptacle 30 on the base 18. The location of the spout 80 at the bottom of the container 14, and the wall 34 of the receptacle 30, prevent the container 14 from being properly disposed in the receptacle 30 and on the base 18, unless the spout 80 is aligned with the alignment indentation 108. Thus, as the container 14 is received in the receptacle 30 of the base 18, the spout 80 is received in the alignment indentation 108. In addition, the alignment indentation 108 and spout 80 can act to prevent the container 14 from rotating on the base 18 when the motor is operated. The alignment indentation 108 is an example of one means associated with the base and container for aligning the spout with the cup indentation. Other means for aligning the spout 80 with the indentation 100 include, for example, mating protrusions and indentations formed between the base 18 and the container 14, such as between the receptacle or socket 30 and the bottom portion 46.

The wall 34 of the receptacle 30 advantageously can include an angled upper surface 112 angled towards the alignment indentation 108. Thus, the wall 34 can have a smaller height proximate the alignment indentation 108, and a larger height distal from the alignment indention. In addition, the wall 34 can be arcuate or circular to surround the receptacle 30. Thus, if the container 14 is places on the base 18 or in the receptacle 30 without being properly aligned, the spout 80 abuts the upper surface 112 of the wall 34, and is guided to the alignment indentation 108 by the angle of the wall 34. In one aspect, the wall 34 can extend entirely around the receptacle 30 in a continuous arc, with the most distal portion of the wall 34 having the greatest height, and decreasing in height towards the alignment indentation 108. The circular or arcuate shape of the wall 34 facilitates rotation of the container 14 in the receptacle 30 until the spout 80 is aligned with the alignment indentation 108.

As stated above, the container 14 can be circular to facilitate fitting within, and turning within, the circular wall 34 of the receptacle 30. The container wall or shell can have an inverted, circular, frusto-conical shape. In addition, it has been found that the circular, conical shape of the container 14 can impart a fast, vortex action to the contents or ingredients in the container 14 when the mixing assembly or blades are operated. It is believed that the circular conical shape of the container 14 contributes to the vortex action of the contents by having a natural shape of a whirlpool or vortex. In one aspect, the circular, conical shape of the container has an angular orientation from a vertical axis approximately 10 to 25 degrees. In another aspect, the angular orientation can be substantially 15 degrees.

It has been found that the vortex action of the circular conical shape of the container, in conjunction with selective pivoting of the stir stick 62, can assist in mixing the contents. Rotating, or pivoting the stir stick 62, tends to disrupt the vortex and direct or drive ingredients downwardly. Thus, the circular conical shape of the container 14 facilitates a circular vortex flow, while the stir stick 62 facilitates directing ingredients vertically, and driving ingredients towards the blades.

In addition, protrusions 116 can extend inwardly from the wall of the container 14 to facilitate mixing or blending. The protrusions 116 cause a more turbulent flow as the contents or ingredients flow past the protrusions 116.

In addition, the stirring portion 74 of the stir stick 62 can be configured to facilitate stirring or mixing. The stirring portion 74 itself can be selectively manipulated or pivoted by the user to stir or mix the ingredients. In one aspect, the stirring portion 74 can include broad or wide fins 120, similar to a spatula, to push or move the ingredients as the stirring portion 74 is pivoted. In another aspect, the stirring portion 74 can include at least two fins 120 and 122 extending therefrom in transverse directions to a longitudinal axis of the stirring portion 74, and in transverse directions to one another, to facilitate stirring and mixing. Thus, the stirring portion 74 can have a cross section in the shape of a cross ("×") or plus ("+") shape. Therefore, as the stirring portion 74 is pivoted in a circular direction, a broad surface of at least one of the fins 120 or 122 will push against the ingredients.

In addition, the stir stick 62 or stirring portion 74 can merely extend into the container 14. The fins 120 and 122 can extend into the flow of the ingredients and cause more turbulent mixing, much like the protrusions 116 on the inner surface of the container 14.

A bumper 126 advantageously can be located on a lower end of the stir stick 62 to contact the inner surface or wall of the container 14 as the stir stick is pivoted. The bumper 126 can be formed of a flexible material to resist marring the container. It will be appreciated that repeated contact between two objects, such as the stir stick and container, can result in marring, and that can be unsightly, especially with a transparent or translucent container. Thus, as the user stirs the ingredients in the container 14 with the stir stick 62, the lower end may often strike the wall of the container 14, but the bumper 126 will resist marring.

In one aspect, the bumper 126 can be an o-ring. An annular indentation or groove can be formed in the lower end of the stir stick 62 or stirring portion 74 to receive the o-ring or bumper 126. The o-ring or bumper 126 can surround the lower end of the stirring portion 74.

As is known in the art, the base 18 can be configured to be disposed on a support surface, such as a counter or work surface. Feet or tabs 130 can be located on the bottom of the base 18 so that base 18 rests on the feet or tabs 130. The feet or tabs 130 can be formed of a high friction material, such as rubber or the like, to resist sliding or movement of the base during operation. In one aspect, the feet or tabs 130 can be located inwardly from a perimeter of the base 18, or with the alignment protrusions 108 extending outwardly past the feet or tabs 130. Thus, the base 18 can be positioned on the edge of the counter or work surface, so that the spout 80 and alignment protrusions 104 extend past the edge, so that a larger glass can be positioned under the spout 80 without interference from the counter or work surface.

In another aspect, the alignment protrusions 104 can extend outwardly from the base 14 to a location substantially at or near a vertical location of the spout 80, and the feet 130 can be located at the outer perimeter of the protrusions 104. Thus, the feet 130 and protrusions 104 can resist tipping of the smoothie maker 10 due to force, such as a downward force, exerted on the handle or the spout 80.

Controls or a control panel with buttons 134 for controlling the operation of the motor 18 or smoothie maker 10 also can be disposed on the base 18. As is known in the art, the controls or buttons 134 can be electrically coupled to the motor to control its operation. The buttons 134 can include an on/off button, speed control, etc.

In operation the lid 54 can be removed from the container 14 and ingredients for a smoothie or other frozen drink placed within the container 14. Alternatively, the lid 54 can remain on the container 14, and the ingredients can be inserted through the opening 58 of the lid 54, with the stir stick 90 removed therefrom. The container 14 may be disposed on the base 18 before the ingredients are placed in the container 14, or after. The mixing assembly 42 may be actuated, by operating the motor 22, in order to blend the ingredients within the container 14. In addition, a user may grasp the handle portion 78 of the stir stick 62, and pivot or rotate the stir stick, such that the stirring portion 74 of the stir stick facilitates moving and mixing the ingredients in the container 14. After the ingredients or contents are blended, a glass or cup may be placed under the spout 80, and in the cup or glass indentation 100. The handle of the spout 80 can be operated to dispense the contents from the container 14, through the spout 80, and into the cup or glass.

In accordance with another aspect of the present invention, the spout 80 can be a removable spout, or can be removably attached to the container 14 or bottom portion 46. For example, the spout 80 can threadably engage the container 14. A seal can be positioned between the spout 80 and the container 14 to resist leaking. A cap 140 can be removably attached to the container 14 or bottom portion 46 thereof to cover the opening 81 in the container 14 when the spout 80 is removed. Similarly, the cap 140 can threadably engage the container 14, and a seal can be positioned between the cap 140 and container 14 to resist leaking. Thus, the smoothie maker or beverage mixer 10 can be used in more of a food processing manner, or with more solid ingredients, such as nuts, with the spout 80 removed and the opening 81 covered by the cap 140. It will be appreciated that removing the spout 80 prevents the more solid ingredients from clogging the spout 80.

As the contents of the container 14 are dispensed, the fluid pressure decreases. Thus, it can be difficult to dispense the remaining contents of the container 14. A protrusion or wall 92 can be located adjacent an opening 81 in the container 14 for the spout 80. The protrusion or wall 92 can extend into the interior from the wall of the container 14. The protrusion or wall 92 can be located on the downstream side of the opening 81, or opposite the rotational direction of the blades 42, for directing the flow of the contents towards the opening 81, and thus out of the spout 80. Thus, the mixing assembly 38 or blades 42 can be actuated to create a centrifugal (centripetal) flow which forces the contents outwardly against the inner surface of the container 14, while the protrusion or wall 92 interrupts or blocks the flow, and directs the contents out of the opening 81 to the spout 80. Thus, a glass or cup may be disposed adjacent the base 18 and under the spout 80 to receive the contents of the container 14 when the spout 80 is operated.

Figure 8:
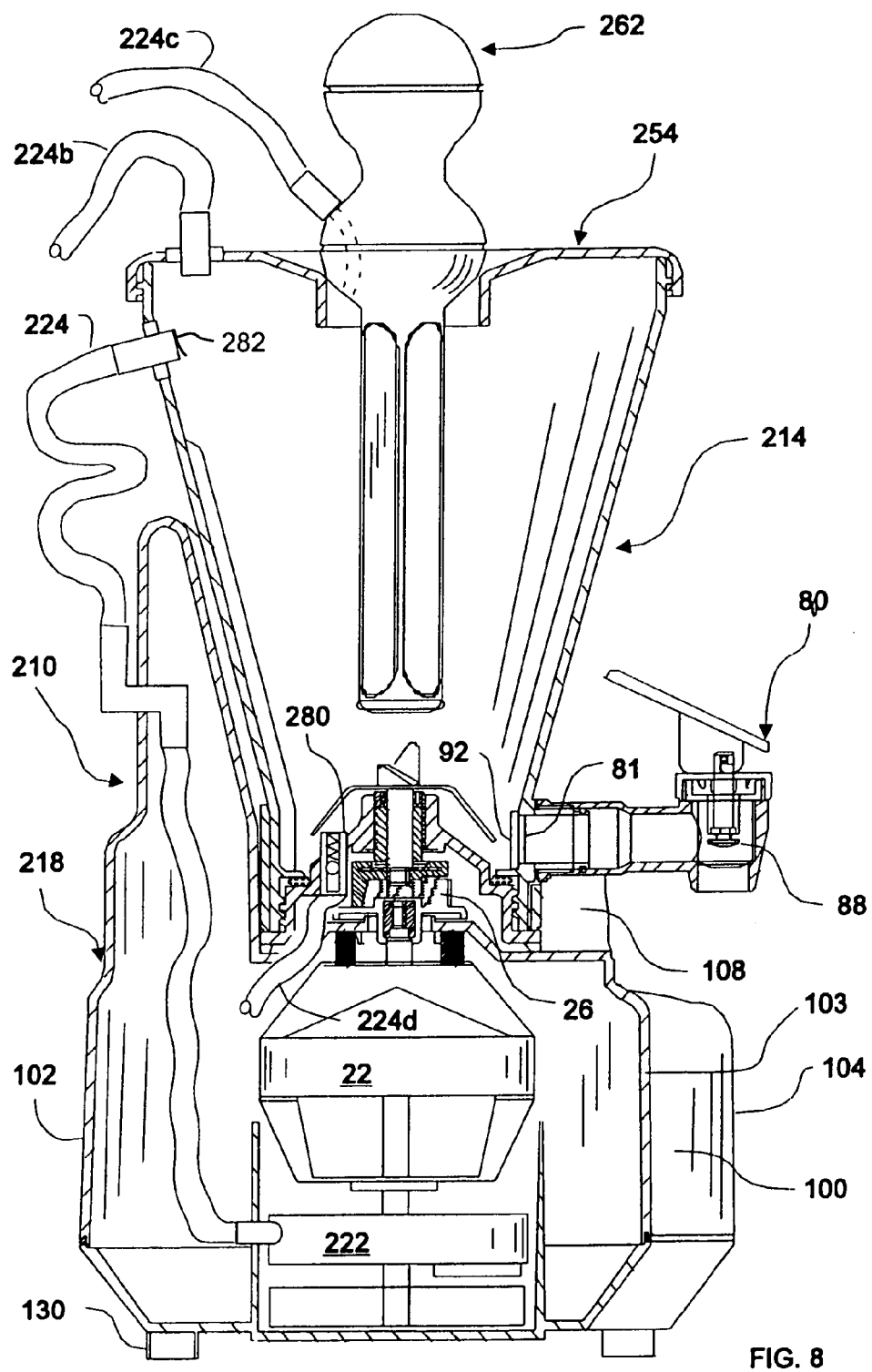
FIG. 8 is a cross sectional side view of another smoothie maker or beverage mixer in accordance with an embodiment of the present invention.

As described above, although the length of the spout 80 can be minimized to facilitate flow, the contents of the container can be thick or viscous, and thus difficult to dispense through the spout. Referring to FIG. 8, another smoothie maker 210 is shown that is similar in many respects to the one described above. The smoothie maker 210 includes a pressure system for creating an increased pressure in the container 214 to assist in expelling the contents through the spout 80. The pressure system can include an air pump 222 to pump air into the container 214, creating an increased pressure in the container to exert a force on the contents and force the contents out through the spout. An air line 224 can be operatively coupled to and between the air pump 222 and the container 214 to deliver air from the pump to the container. The air pump 222 can be disposed in the base 18 and can be operatively coupled to, and driven by, the motor 22. The air pump 222 can be a compressor, a blower, a pump, or the like.

The container 214 can form a substantially air-tight enclosure to maintain the increased air pressure. A base portion 246 can be attached to a bottom of the container 214, and a lid 254 can be couplable to a top of the container. The base portion 246 and the lid 254 further form the substantially air-tight enclosure. In addition, a stir stick 262 can be carried by an aperture in the lid 254, and can further seal the aperture in the lid to maintain the substantially air-tight enclosure.

As described above, the air line 224 can be coupled the container 214. A connector 270 can connect the air line 224 to the container. An aperture can be formed through the container 214, or through the connector 270. The connector 270 or aperture can be positioned at a top of the container 214 to resist the contents from entering the air line. In another aspect, the air line 224b can be coupled to the lid, or at an aperture in the lid. Again, a connector can connect the air line to the lid. Connecting the air line to the lid positions the air line at the top of the container to resist contents of the container from entering the air line. In another aspect, the air line 224c can be coupled to the stir stick 262. An aperture can extend through the stir stick, from an upper portion above the lid, to a lower portion below the lid. In another aspect, the air line 224d can be coupled to the base portion 246. An aperture can extend through the base portion. A check valve 280 can be coupled to the air line 224d to allow air into the container while resisting exit of contents of the container into the air line. The check valve 280 can include any type of valve, such as a flap valve, a ball valve, etc. It is understood that the check valve can be disposed in any of the air lines. In addition, a check valve 282 can be coupled to a top of the airline 224 to resist contents of the container from entering into the air line.

Figure 8B:
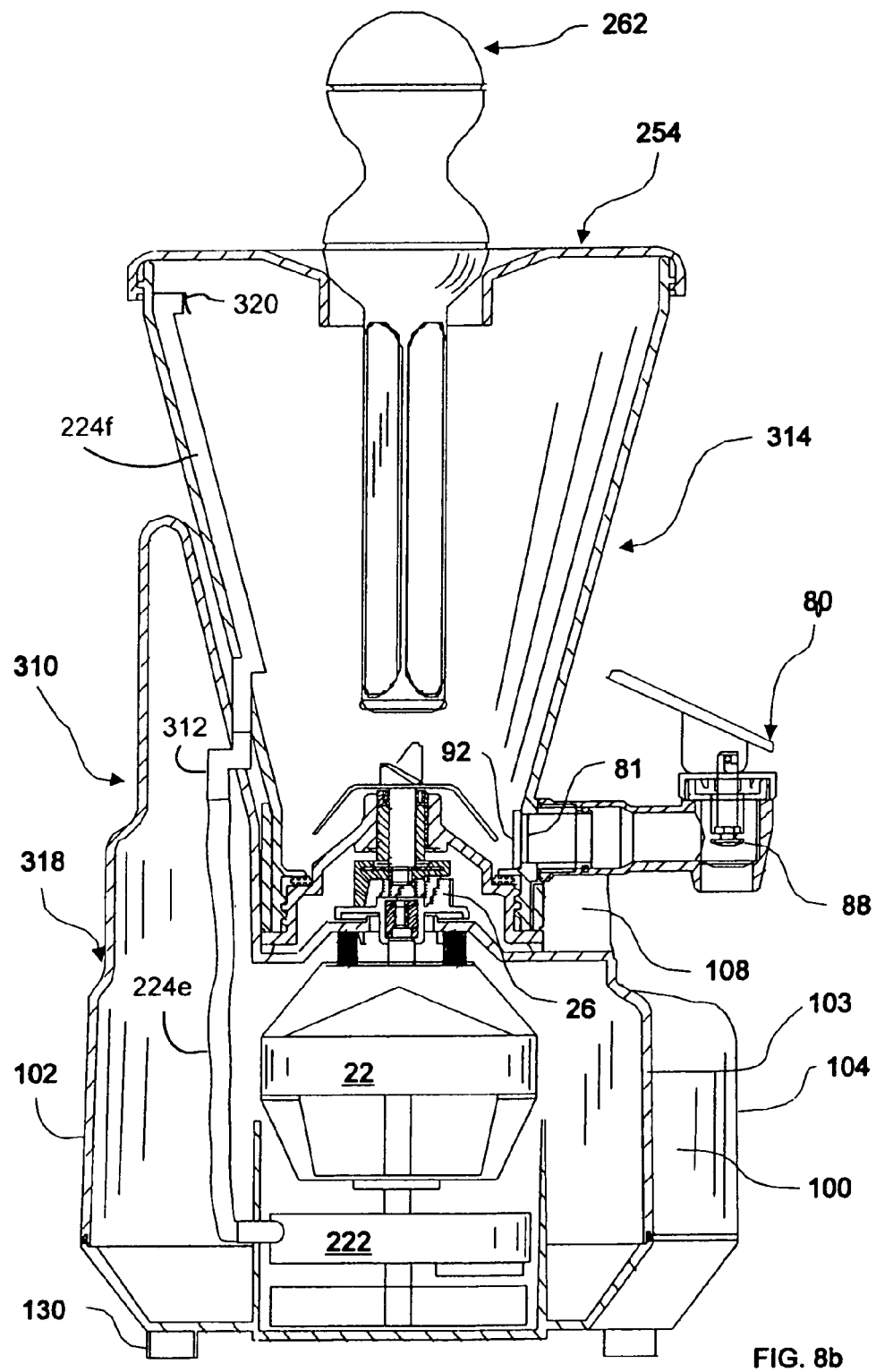
FIG. 8b is a cross sectional side view of another smoothie maker or beverage mixer in accordance with an embodiment of the present invention.

Referring to FIG. 8b, a smoothie maker 310 can be configured with an air connector 312 between a container 314 and a base 318 so that a connection is formed when the container 314 is placed onto the base 318. An air line 224e can extend from the pump 222 to the connector 312. In addition, a portion 224f of the air line can be formed in or carried by the container 314, and can extend from the connector 312 to a position at a top of the container. Again, positioning an outlet of the air line at the top of the container resists the contents of the container from entering the air line. The portion 224f of the air line can be formed in a wall of the container. A bottom of the portion 224f of the air line of the container can engage the connector 312 when the container is placed onto the base. A check valve 320 can be coupled to the portion 224f of the airline at a top thereof to resist the contents of the container from entering the air line. The check valve 320 can be of any type, such as including a flap.

Figure 10:
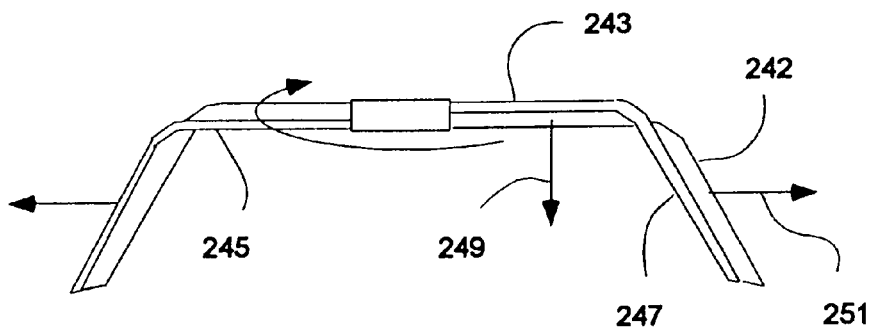
FIG. 10 is a side view of a blade or an impeller of the smoothie maker of FIG. 8.

In addition, the mixing assembly 238 can be configured to assist expelling the contents of the container 214 through the spout 80. Referring to FIGS. 9 and 10, one or more of the blades 242 of the mixing assembly 238 can be configured as an impeller 243. Thus, the impeller 243 can be rotatably disposed in the container, such as with the blades. The impeller 243 can form an oblique angle oriented to drive contents of the container towards the opening 81 in the container and out of the spout 80. The impeller 243 can have a horizontally oriented arm 245, and a vertically inclined arm 247. The horizontal oriented arm 245 extends radially outwardly, and the vertically inclined arm 247 extends outwardly and downwardly at an inclined angle. The horizontal oriented arm 245 can form an oblique angle between a leading and a trailing edge. Thus, as the horizontal oriented arm 245 rotates, the contents are forced downwardly, as indicated by arrow 249, creating a pressure to drive the contents out of the opening 81. Similarly, the vertically inclined arm 247 can form an oblique angle between leading and trailing edges. Thus, as the vertically included arm 247 rotates, the contents are forced outwardly, as indicated by arrow 251, towards the opening 81. It will be appreciated that the impeller 243 can form one or more of the blades 242, or the blades can form the impeller.

Figure 11:
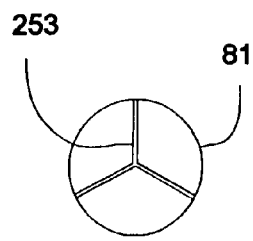
FIG. 11 is a side view of a filter in an opening in a container leading to a spout in accordance with an embodiment of the present invention.

Referring to FIG. 11, a filter can be formed at the opening 81 to resist larger objects, such as ice chunks, from clogging the spout 80. The filter can include one or more cross members 253 extending into or across the opening 81 of the container that leads to the spout.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A beverage mixer device, comprising:
   a) a base including a motor turning a drive mechanism extending therefrom;
   b) a container, disposable on the base, including a mixing assembly rotatably disposed therein and engagable by the drive mechanism;
   c) a spout, operatively coupled to the container, to dispense contents thereof, and having an outlet opening;
   d) a valve, associated with the spout, operable to allow and restrict contents of the container through the spout;
   e) an actuator, associated with the spout and operatively coupled to the valve, to actuate the valve;
   f) a cup indentation, extending into the base under the spout, for receiving a cup so that the cup can be more conveniently placed adjacent the spout in the indentation to receive liquid flow from the spout;
   g) the cup indentation being provided between two diverging projecting portions of the base and beneath the spout; and
   h) means, associated with the base and container, for aligning the spout with the cup indentation, wherein the means for aligning the spout includes an alignment indentation, formed in the base, configured to receive the spout therein to align the spout with the cup indentation of the base.

2. A device in accordance with claim 1, wherein the cup indentation includes an indentation configuration of the base to reduce a length of the spout to reduce frictional loses of contents flowing through the spout.

3. A device in accordance with claim 1, wherein the base includes a perimeter base wall extending around and defining a perimeter of the base; and wherein the indentation is formed in a perimeter of the base by the perimeter base wall.

4. A device in accordance with claim 1, wherein the indentation extends horizontally into the base and is formed by a vertically oriented portion of a perimeter base wall.

5. A device in accordance with claim 4, wherein the vertically oriented portion of the perimeter base wall extends from a top of the indentation proximate the spout when the container is disposed on the base to a bottom of the indentation proximate a bottom of the base.

6. A device in accordance with claim 1, wherein the spout has a proximal end operatively coupled to the container and extends therefrom to an opposite distal end, an outlet opening being positioned at the distal end; and wherein the actuator is positioned at the distal end of the spout.

7. A device in accordance with claim 1, wherein the valve is disposed at the distal end of the spout.

8. A device in accordance with claim 1, further comprising:
   a) at least one impeller, associated with the mixing assembly in the container; and
   b) the at least one impeller forming an oblique angle oriented to drive contents of the container towards an opening in the container and out of the spout.

9. A device in accordance with claim 1, further comprising:
   means, associated with the cup indentation in the base, for resisting tipping of the mixer when the valve is operated to dispense contents from the container.

10. A device in accordance with claim 1, wherein the outlet opening is horizontal and faces downward.

11. A device in accordance with claim 1, wherein the projecting portions extend outwardly at least as far as the outlet opening.

12. A device in accordance with claim 1, wherein the outlet opening faces downward; and wherein the projecting portions extend outwardly at least as far as the outlet opening.

13. A device in accordance with claim 1, wherein the container is removably disposed on a top of the base and extends above the base; wherein the container is enclosed from the outlet opening at the spout to an openable upper end; and wherein the mixing assembly includes a plurality of blades rotatable within the container.

14. A beverage mixer device, comprising:
   a) a base including a motor turning a drive mechanism extending therefrom;
   b) a container, disposable on the base, including a mixing assembly rotatably disposed therein and engagable by the drive mechanism;
   c) a spout, operatively coupled to the container, to dispense contents thereof, and having an outlet opening;
   d) a valve, associated with the spout, operable to allow and restrict contents of the container through the spout;
   e) an actuator, associated with the spout and operatively coupled to the valve, to actuate the valve;
   f) a cup indentation, extending into the base under the spout, for receiving a cup so that the cup can be more conveniently placed adjacent the spout in the indentation to receive liquid flow from the spout;
   g) protrusions, extending outwardly from the base and forming extensions of the cup indentation to a position near either side of a vertical location of the spout, wherein the protrusions resist tipping of the mixer when the valve is operated to dispense contents from the container; and
   h) means, associated with the base and container, for aligning the spout with the cup indentation, wherein the means for aligning the spout includes an alignment indentation, formed in the base, configured to receive the spout therein to align the spout with the cup indentation of the base.

15. A device in accordance with claim 14, wherein the base includes a perimeter base wall extending around and defining a perimeter of the base; and wherein the indentation is formed in a perimeter of the base by the perimeter base wall.

16. A device in accordance with claim 14, wherein the indentation extends horizontally into the base and is formed by a vertically oriented portion of a perimeter base wall.

17. A device in accordance with claim 16, wherein the vertically oriented portion of the perimeter base wall extends from a top of the indentation proximate the spout when the container is disposed on the base to a bottom of the indentation proximate a bottom of the base.

18. A device in accordance with claim 17, wherein the spout has a proximal end operatively coupled to the container and extends therefrom to an opposite distal end, the outlet opening being positioned at the distal end; and wherein the actuator is positioned at the distal end of the spout.

19. A device in accordance with claim 18, wherein the valve is disposed at the distal end of the spout.

20. A device in accordance with claim 17, further comprising:
   a) at least one impeller, associated with the mixing assembly in the container; and b) the at least one impeller forming an oblique angle oriented to drive contents of the container towards an opening in the container and out of the spout.

21. A device in accordance with claim 17, wherein the outlet opening is horizontal and faces downward.

22. A device in accordance with claim 17, wherein the protrusions extend outwardly at least as far as the outlet opening.

23. A device in accordance with claim 17, wherein the outlet opening faces downward; and wherein the protusions extend outwardly at least as far as the outlet opening.

24. A device in accordance with claim 17, wherein the container is removably disposed on a top of the base and extends above the base; wherein the container is enclosed from the outlet opening at the spout to an openable upper end; and wherein the mixing assembly includes a plurality of blades rotatable within the container.

25. A beverage mixer device, comprising:
   a) a base including a motor turning a drive mechanism extending therefrom;
   b) a container, disposable on the base, including a mixing assembly rotatably disposed therein and engageable by the drive mechanism;
   c) a spout, operatively coupled to the container, to dispense contents thereof, and having an outlet opening, wherein the spout is removable, and a cap for removably attaching to the container when the spout is removed;
   d) a valve, associated with the spout, operable to allow and restrict contents of the container through the spout;
   e) an actuator, associated with the spout and operatively coupled to the valve, to actuate the valve;
   f) a cup indentation, extending into the base under the spout, for receiving a cup so that the cup can be more conveniently placed adjacent the spout in the indentation to receive liquid flow from the spout; and
   g) the cup indentation being provided between two diverging projecting portions of the base and beneath the spout.

26. A beverage mixer device, comprising:
   a) a base including a motor turning a drive mechanism extending therefrom;
   b) a container, disposable on the base, including a mixing assembly rotatably disposed therein and engageable by the drive mechanism;
   c) a spout, operatively coupled to the container, to dispense contents thereof, and having an outlet opening, wherein the spout is removable, and a cap for removably attaching to the container when the spout is removed;
   d) a valve, associated with the spout, operable to allow and restrict contents of the container through the spout;
   e) an actuator, associated with the spout and operatively coupled to the valve, to actuate the valve;
   f) a cup indentation, extending into the base under the spout, for receiving a cup so that the cup can be more conveniently placed adjacent the spout in the indentation to receive liquid flow from the spout; and
   g) protrusions, extending outwardly from the base and forming extensions of the cup indentation to a position near either side of a vertical location of the spout, wherein the protrusions resist tipping of the mixer when the valve is operated to dispense contents from the container.

* * * * *